Jan. 14, 1958 H. MOUNTAIN 2,820,090

COLOR TELEVISION

Filed April 1, 1952

Inventor:
Harold Mountain.
By Harold J. Le Visconte
Atty.

United States Patent Office 2,820,090
Patented Jan. 14, 1958

2,820,090

COLOR TELEVISION

Harold Mountain, Los Angeles, Calif.

Application April 1, 1952, Serial No. 279,835
1 Claim. (Cl. 178—5.2)

Figures 1, 2, 3, 4, 5, 6, 7:
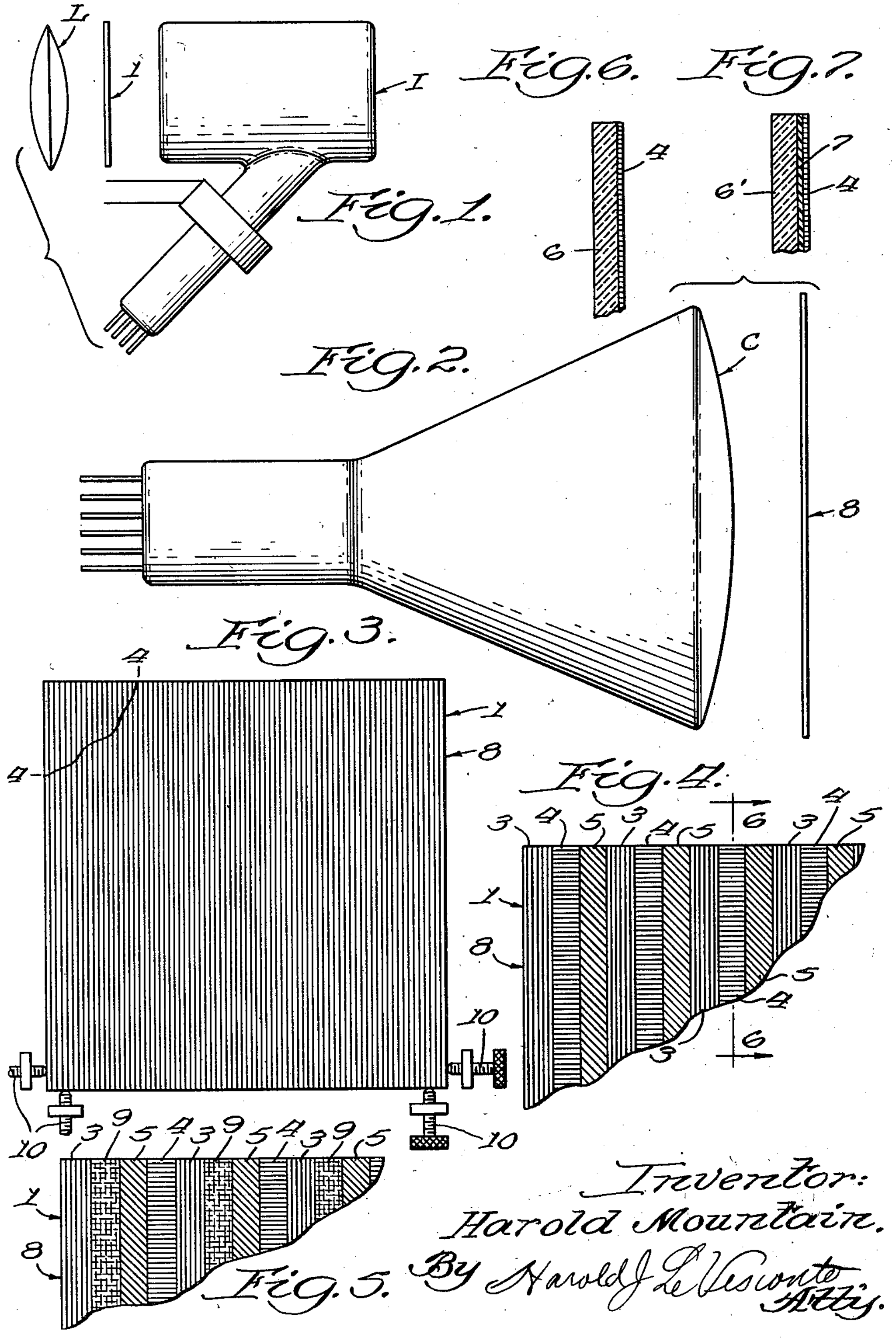

This invention relates to color television and more particularly to a simplified apparatus for transmitting and receiving images in natural color as well as a method of transmitting such images.

Heretofore, proposals for color television have taken one of two forms. In one form, a transparent disc or curtain is moved at a predetermined linear speed or is vibrated at a predetermined rate in front of the transmitter tube; said disc or curtain having successive areas of the primary colors, and such transmitter is combined with a receiving apparatus which includes a corresponding moving screen which is rotated or otherwise moved in front of the cathode ray tube of the receiver in synchronism with the screen element associated with the receiving tube. In another general class of previous proposals, the inner surface of the tubes is provided with a color reflecting and absorbing screen area likewise divided into a series of areas of different primary colors so arranged that the excursions of the scanning beam will receive and project light only when the received light is of a color that will pass through the colored areas of the screens. In both cases, the final result is unsatisfactory in that the moving screen is difficult to maintain in synchronism with the transmitter and in that the aforementioned tubes with the internally disposed color screens require a special set for both transmitter and receiver.

The principal objects of the invention are to provide a simple apparatus and method for transmitting color television which is adaptable to be used with existing apparatus with a minimum of modification, which is susceptible of adjustment with the existing adjustment on the receiver for correlation with the transmitter and which is adapted for economical manufacture.

With the foregoing objects in view, together with such additional objects and advantages as may subsequently appear, the invention resides in the parts and in the construction, combination and arrangement of parts, as well as in the method disclosed in the following specification describing, by way of example, a mode of execution of the invention; reference being had to the accompanying drawings which form a part of said specification and in which drawings:

Fig. 1 is a schematic side elevation of a portion of a television transmitter iconoscope and lens with the transmitter color filter component of the present invention positioned relative thereto, Fig. 2 is a schematic side elevation of a television receiver cathode ray tube with the receiver color filter component of the present invention positioned relative thereto, Fig. 3 is a side elevation of the color filter element shown in Figs. 1 and 2, Fig. 4 is a greatly enlarged, fragmentary view of the portion of Fig. 3 indicated generally by the line 4—4 and showing the arrangement of color filtering bands thereon, Fig. 5 is a view generally similar to Fig. 4 but showing an alternative arrangement of color filtering bands, Fig. 6 is a sectional view taken on the line 6—6 of Fig. 4, and Fig. 7 is a view similar to Fig. 6 but showing an alternative mode of construction of the color filtering element.

Referring to the drawings, Fig. 1 shows an iconoscope I of a television camera having a lens system L disposed in front of the view receiving end of the iconoscope. Interposed between the iconoscope and the lens system is a color filter element 1 such as shown in Fig. 3 comprising a transparent plate 2 having one surface thereof covered with narrow, vertically disposed transparent bands 3, 4 and 5 of three different colors arranged so that any two adjacent bands of the same color are separated by two bands comprising one band each of the other two colors. In the illustrated form of the invention in Fig. 4, the colors are red, blue and green although other orders of arrangement may be provided. The color filter may be conveniently initially formed for example by color photographic processes, from a large chart so that the reduction in scale will increase the sharpness of definition between adjacent bands. The color bands may thus be formed photographically from emulsions applied to the surface of a rigid plate of glass 6 or equally transparent material or be similarly formed on a film 7 (see Fig. 7) which is then mounted on the desired rigid transparent plate 6' as may be most convenient.

A similar color filter element 8 is installed in fixed position in front of and closely adjacent to the viewing surface of the cathode ray tube C of the television receiver; said color filter having the same number of vertically disposed color lines arranged in the same order as in the transmitter and the individual lines being each proportionately wider if, as is usual, the viewing face is larger than the light receiving face of the iconoscope. In operation, as the scanning beam makes its successive excursions across the viewing field, light will be transmitted only at those instants in which the received light is opposite a color band through which it will pass. Correspondingly, light will be created by the receiver on the viewing face of the cathode ray tube only at the corresponding time and position and if the color filter is horizontally adjusted to receive the light through a band of corresponding color the visual image effect will be of the transmission of color. The color bands of the receiver or rather the groups comprising one of each of the colors are of less width than the total width of horizontal adjustment of the receiver picture so that in tuning the receiver it is possible to effect an adjustment that is exacly synchronized with the transmitted signals with consequent reproduction of the transmitted image in the colors in which it was received by the transmitting camera.

Fig. 5 shows an alternative form of color filter in which yellow bands 9 have been added to the red, blue and green bands of the first described form. It will be understood that the order of succession of the bands in each group may be arranged in any desired order so long as the same order is maintained in each group and so long as the filter elements in the camera and the receiving set are identical except, if necessary, for size. If desired, the filter elements may be mounted for adjustment to fixed positions, laterally angularly, and vertically by any desired means, as for example, by screws 10 as shown in Fig. 3.

Thus, by the simple provision of the novel color filter elements above described, existing television equipment may be readily adapted for the transmission of views in color without the necessity of providing synchronized moving color filter means or without the necessity of providing special iconoscope and cathode ray tubes and completely new receiving sets; the only additional requirement being a possible increase in amplification to compensate for light loss through the interposed filters. In the case of receivers, the present degree of amplification in brightness appears to be sufficient to care for this.

While the foregoing specification discloses one mode of execution of the invention, modifications will suggest themselves to others in the light of the foregoing disclosure and, therefore, the invention is not to be deemed to be limited to the exact form here described and illustrated but to include as well all such modifications as shall come within the purview of the appended claim.

I claim:

A color filter means effective to enable black and white television transmitting and receiving apparatus to transmit images with the illusion of color; said means comprising a pair of filter elements each comprising a flat transparent plate having a color transmitting film applied thereto by a photographic process; each of said films comprising identically arranged series of vertically disposed bands of four different colors with each two bands of the same color being separated by three bands comprising one band of each of the other colors; one of said filter elements being interposed in front of the light receiving area of the iconoscope tube of the television camera and the other of said filters being disposed in front of and closely adjacent to the viewing face of the receiver and said filter elements being proportional in area to the light receiving area of the iconoscope and the light emitting area of the receiver and having the same numbers of color bands in the same arrangement and the filter element having the larger area having color bands of proportionate greater width.

References Cited in the file of this patent

UNITED STATES PATENTS

| | | |
|---|---|---|
| 802,471 | Powrie | Oct. 24, 1905 |
| 2,296,908 | Crosby | Sept. 29, 1942 |
| 2,310,863 | Levernz | Feb. 9, 1943 |
| 2,389,979 | Huffnagle | Nov. 27, 1945 |
| 2,416,056 | Kallmann | Feb. 18, 1947 |
| 2,431,115 | Goldsmith | Nov. 18, 1947 |
| 2,452,293 | De Forest | Oct. 26, 1948 |
| 2,528,510 | Goldmark | Nov. 7, 1950 |
| 2,532,511 | Okolicsanzi | Dec. 5, 1950 |
| 2,617,875 | De Forest | Nov. 11, 1952 |
| 2,674,649 | Wetzel | Apr. 6, 1954 |